United States Patent [19]

Jozuka

[11] 3,944,029

[45] Mar. 16, 1976

[54] DAMPER FOR PRINTING AND THE LIKE

[75] Inventor: Masao Jozuka, Nagoya, Japan

[73] Assignee: Centronics Data Computer Corporation, Hudson, N.H.

[22] Filed: Nov. 22, 1974

[21] Appl. No.: 526,419

[52] U.S. Cl. ................ 188/282; 197/183; 188/297; 197/64

[51] Int. Cl.$^2$ ............................................ F16F 9/50

[58] Field of Search .......................... 197/64, 65–68, 197/176, 177, 183; 101/93.15, 93.16; 188/266, 281, 282, 297

[56] References Cited

UNITED STATES PATENTS

| | | | |
|---|---|---|---|
| 2,808,144 | 10/1957 | Lambert et al. | 197/183 |
| 2,812,533 | 11/1957 | Falk | 188/297 X |
| 2,909,263 | 10/1959 | Wheeler | 197/183 |
| 2,989,299 | 6/1961 | Modrich | 188/282 X |
| 3,358,806 | 12/1967 | Krauss et al. | 197/64 X |
| 3,861,513 | 1/1975 | Riley | 197/64 |

*Primary Examiner*—Edgar S. Burr
*Assistant Examiner*—Edward M. Coven
*Attorney, Agent, or Firm*—Ostrolenk, Faber, Gerb & Soffen

[57] ABSTRACT

A damper for line printers and the like in which the print head moves from left to right across a paper document during the printing phase and upon completion of a line of print, moves in the "carriage return" direction at a more rapid rate to return to the left-hand margin of the paper document preparatory to the printing of the next line of characters.

The damper is utilized to attenuate and cushion the impact of the print head as it approaches the left-hand margin of the paper document and comprises a stationary mounted cylinder and a cooperating print head mounted plunger having a rollably mounted O-ring. As the print head is moving rapidly in the "carriage return" direction, the plunger enters into the cylinder, causing the O-ring to frictionally engage the interior surface of the cylinder, whereupon the O-ring is caused to seal openings provided in the groove in which the O-ring is seated to create a "dash-pot" action for causing the air captured in the cylinder to be compressed and thereby dampening the impact of the rapidly moving print head as it is brought to a halt.

As the print head moves in the print direction, the O-ring is caused to roll away from the breather holes to facilitate rapid removal of the plunger from the cooperating cylinder.

6 Claims, 7 Drawing Figures

DAMPER FOR PRINTING AND THE LIKE

BACKGROUND OF THE INVENTION

Line printers are typically comprised of a print head assembly slidable along a guide means and normally moving in a forward or print direction from the left-hand to the right-hand margin of a paper document, at which time printing occurs. As soon as the print head reaches the right-hand margin or as soon as a short line or print, i.e., shorter than a full line of print, is completed, the drive mechanism is typically released to place the print head under the influence of a return spring or clutch actuated mechanism which rapidly returns the print head, in what is typically referred to as a carriage return operation, toward the left-hand margin. The print head must be brought to an abrupt stop preparatory to printing the next line of characters. To accomplish this, it is typical to provide a rubber bumper mounted to the carriage assembly which abuts the surface of a stationary member attached to the printer frame or a surface of the frame itself. Since the print head is caused to impact the stationary surface at full velocity, the assembly is jarred and may be damaged as a result of performance of many "carriage return" operations.

In order to prevent jarring of the components, a dash-pot assembly is typically employed and comprises a stationary mounted open-ended cylinder and a co-axially aligned piston or plunger secured to the print head assembly. As the print head moves rapidly in the "carriage return" direction, the plunger enters into the open end of the cylinder to compress the air captured therein, some of which is released through a breather hole at a controlled rate, thereby bringing the print head to a stop without jarring action.

Immediately thereafter, the print head is moved in the print direction, causing a plunger to be withdrawn from the cylinder. The vacuum condition created therein acts as a deterrent, preventing the print head from being rapidly accelerated to "print" velocity.

BRIEF DESCRIPTION OF THE INVENTION

The present invention is characterized by providing a novel "dash-pot" assembly which provides a one-way valve operation for providing a dampening effect at the termination of the "carriage return" operation while enabling the print head to rapidly accelerate to the print velocity as the print head is moved in the print direction.

The damper assembly comprises a stationary mounted open-ended cylinder having a breather hole at the closed end and adjustment means for controlling the egress of air therefrom. A co-axially aligned plunger is mounted to the reciprocating print head and is provided with a grooved cylindrical member having a rollable O-ring seated in the annular groove. As the print head moves rapidly in the return direction, the plunger moves into the open-ended cylinder. The O-ring makes rolling engagement with the interior surface of the cylinder to seal breather holes provided in the cylindrical member. The cylinder breather hole permits air to be released at a controlled rate, thus dampening the impact of the print head, causing it to come to rest in a non-jarring manner.

As the head begins to accelerate in the forward direction preparatory to printing the next line, rolling engagement of the O-ring with the interior surface of the cylinder causes the O-ring to roll over and hence unseal the cylinder breather holes to facilitate rapid removal of the plunger from the cylinder enabling the print head to rapidly accelerate to the print velocity.

BRIEF DESCRIPTION OF THE FIGURES AND OBJECTS

It is, therefore, one object of the present invention to provide a novel, one-way damper of simplified design especially advantageous for use with line printers and the like.

Another object of the present invention is to provide a novel one-way damper for use with line printers and the like comprising a cooperating open-ended stationary mounted cylinder and a co-axially aligned plunger secured to a reciprocating print head, said plunger having a rollable O-ring for selectively sealing and opening the plunger breather holes to provide dampening during a carriage-return operation and to permit rapid acceleration of the print head preparatory to a printing operation.

The above as well as other objects of the present invention will become apparent when reading the accompanying description and drawings, in which.

Figure 4A:
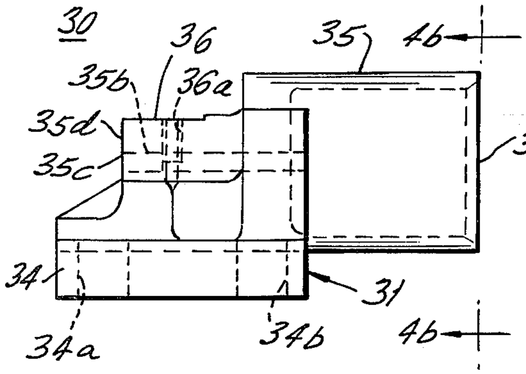
Figure 4B:
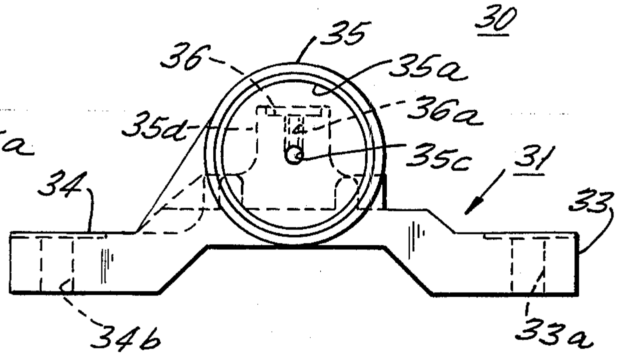
Figure 4C:
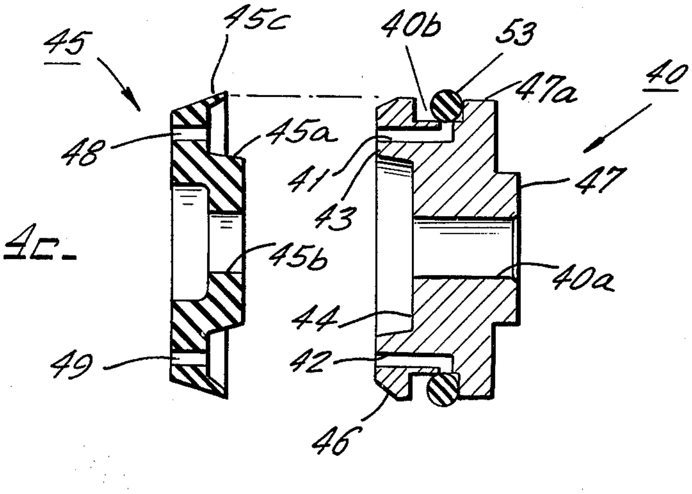
Figures 2, 3A, 3B:
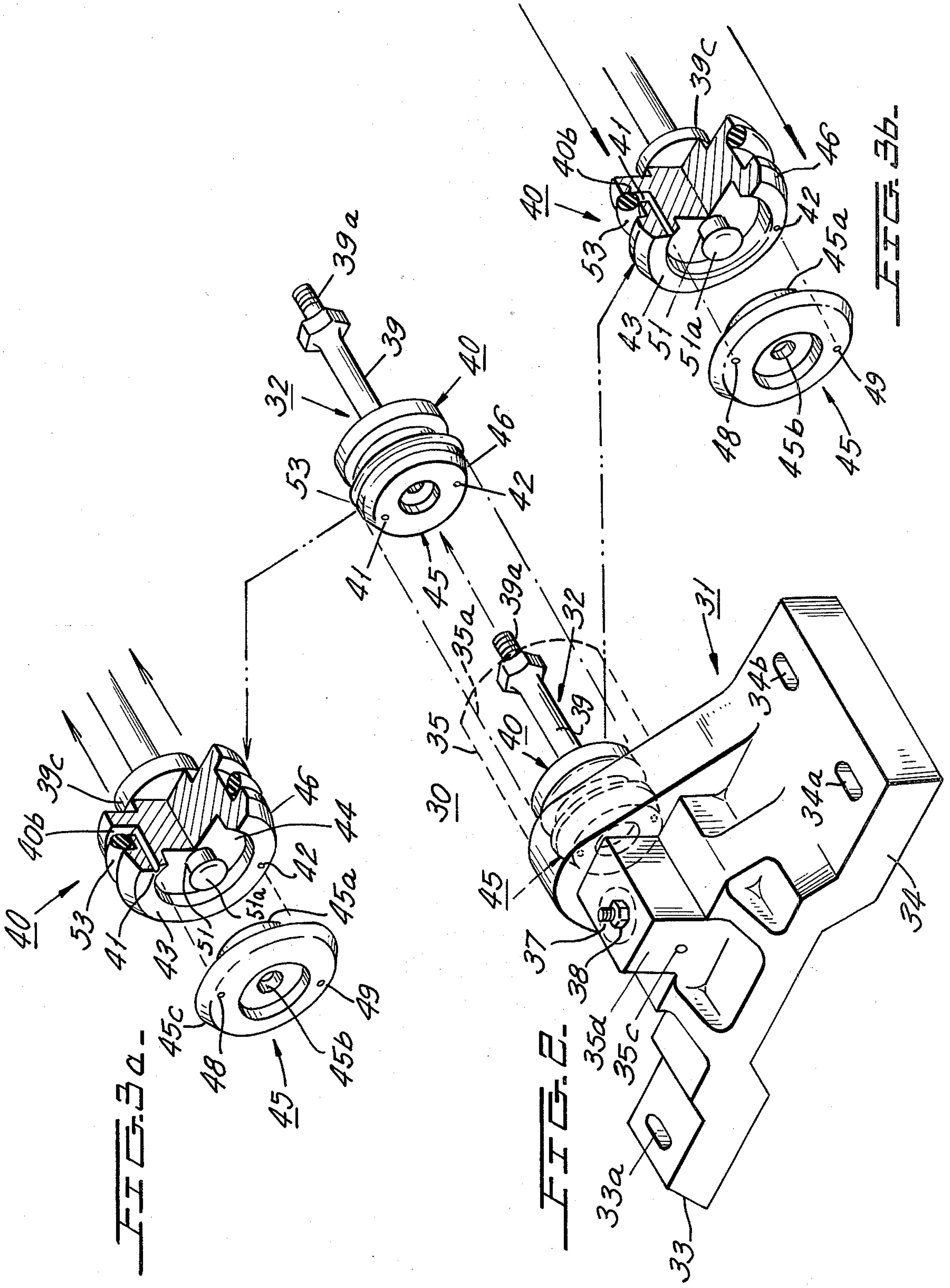
FIG. 2 is a perspective view showing a damper assembly embodying the principles of the present invention.

FIGS. 3*a* and 3*b* are partially sectionalized perspective views showing the plunger in greater detail with the O-ring being shown as respectively sealing and unsealing the plunger breather holes;

FIGS. 4*a* and 4*b* show side and front elevational views respectively of the stationary mounted cylinder; and FIG. 4*c* shows a sectional view of the plunger assembly of FIGS. 2, 3*a* and 3*b*.

DETAILED DESCRIPTION OF THE INVENTION

Figure 1:
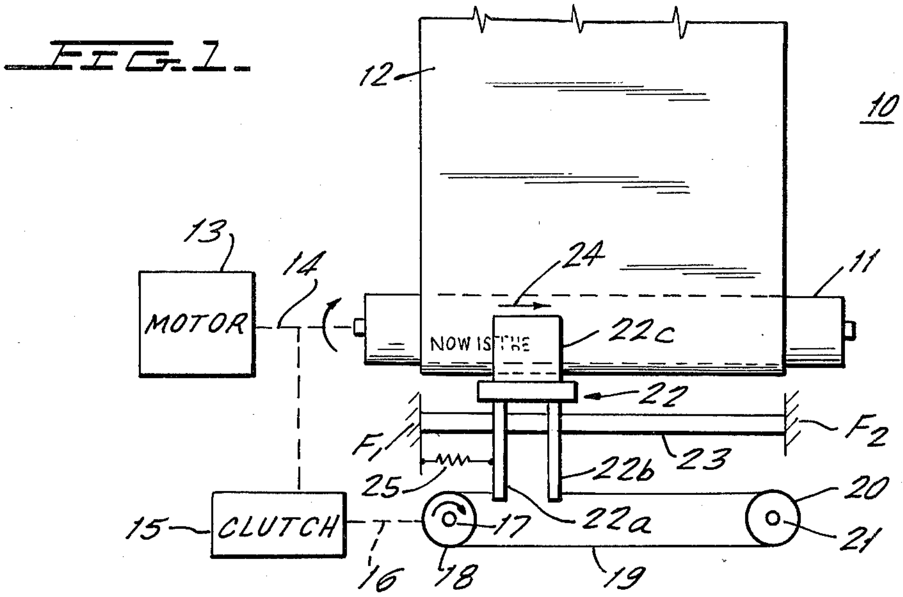
FIG. 1 is a simplified block diagram showing the elements of a line printer which are both necessary and helpful for an understanding of the present invention.

FIG. 1 shows the basic elements of a line printer 10 which is comprised of a rotatable platen 11 for advancing paper document 12 in the line feed direction. Platen 11 is rotated by motor 13 mechanically coupled thereto as shown by dotted line 14. Motor 13 also has its output coupled through an electromagnetic clutch 15 which, when energized, couples motor 13 through energized clutch 15 and mechanical coupling 16 to a shaft 17 which rotates a drive pulley 18. A timing belt 19 is entrained about drive pulley 18 and driven pulley 20 mounted to rotate upon shaft 21. The free ends of timing belt 19 are secured to mounting portions 22*a* and 22*b* of a carriage assembly 22 which is guided upon a pair of cylindrical rods 23 (only one of which is shown in FIG. 1) to maintain carriage 22 substantially in a spaced parallel relationship with paper document 12. A print head 22*c* is secured upon carriage 22. Although not shown for purposes of simplicity, it should be understood that electronic drive means are coupled to print head 23 for forming either whole characters or dot patterns by suitable impacting means which impact against an inked ribbon to form characters as the print head 23 is moved across paper document 12 in a direction shown by arrow 24. An elongated spring 25 shown in schematic fashion for purposes of simplicity has its free ends mounted to one frame portion $F_1$ of the printer machine frame and one of the arms 22*a* of carriage 22. Return spring 25 may be replaced by a clutch-actuated return mechanism, if desired. The spring 25 has been described herein as the return mechanism for purposes of simplicity.

In order to perform a printing operation, motor 13 and clutch 15 are energized to cause the carriage 22 and hence the print head 22c to move in the direction shown by arrow 24 at a predetermined print velocity so as to print characters "on the fly." The electronic means (not shown) manipulates the print head so as to form the appropriate characters or character dot patterns, as the case may be.

As soon as a full line of print or a partial line of print is completed, clutch 15 is deenergized. Since the print head has moved away from machine frame portion $F_1$, spring 25 will be stretched. As soon as clutch 15 is deenergized, carriage 22 comes under the influence of stretched spring 25 causing the carriage to move rapidly and typically at a velocity faster than print velocity, toward the left-hand margin of paper document 12.

FIG. 2 shows a damper assembly 30 of the present invention as being comprised of a stationary mounted cylinder member 31 positioned in the vicinity of machine frame portion $F_1$. A plunger assembly 32 has a threaded portion 39*a* which threadedly engages brackets 22*a* of carriage 23. The elements 31 and 32 are positioned so that their longitudinal axes are in coaxial alignment as can clearly be seen from FIG. 2.

Cylinder 31 has a mounting portion provided with opening 33*a* in leg 33 and openings 34*a* and 34*b* in leg 34. Openings 33*a*, 34*a* and 34*b* are somewhat elongated slots to provide for appropriate adjustment of the cylinder assembly relative to plunger assembly 32. A threaded opening 33*b* perpendicular to and communicating with opening 33*a* is provided in leg 33 for locking the fastener extending through opening 33*a*. Assembly 31 is further comprised of a hollow cylindrical portion 35 open at end 35*a* and having a diameter selected to rollingly engage and hence operate the plunger mounted O-ring, as will be more fully described hereinbelow.

The base or innermost end of opening 35*a* communicates with a passageway or air conduit 35*b* forming a cylinder breather hole 35*c* which terminates in vertical wall 35*d*.

Adjacent top surface 36 has a tapped opening 36*a* arranged substantially perpendicular to passageway 35*b* and communicating therewith. A set screw 37 threadedly engages tapped opening 36*a* and is adjustably extendible into breather opening 35*b* to adjust the rate of flow of air during the ingress and egress of air therethrough. Nut 38 may be tightened against surface 36 to lock set screw 37 into the desired position.

The plunger assembly is further comprised of an elongated rod 39 threaded at free end 39*a* and having its opposite end extending through a central opening 40*a* in circular shaped member 40. Circular shaped member 40 is provided with continuous annular groove 40*b* extending about its periphery. A pair of breather holes 41 and 42 are arranged in spaced parallel fashion relative to the longitudinal axis of member 40 and extend between left-hand side wall 43 and annular groove 40*b*.

The left-hand side wall of member 40 is provided with a circular shaped recess 44.

A resilient substantially disc-shaped member 45 has a central portion 45*a* adapted to be press fittingly inserted into recess 44. A central opening 45*b* is coaxially aligned with opening 40*a* in plunger member 40. An inwardly turned lip portion 45*c* rests against the continuous annular bevel 46 provided around the periphery and adjacent the left-hand surface 43 of member 40. Resilient member 45 is provided with a pair of openings 48 and 49 which are respectively co-axially aligned with openings 41 and 42 of plunger member 40.

As was mentioned hereinabove, projection 45*a* is press fitted into recess 44 with openings 48 and 49 coaxially aligned with openings 41 and 42 respectively.

The left-hand end of rod 39 threadedly engages a tapped cylindrical collar 51 having an outwardly directed flange 51*a* at its extreme left-hand end (note especially FIGS. 3*a* and 3*b*). Rod 39 is further provided with a cylindrical flange 39*c* having a left-hand face abutting the right-hand face 47 of plunger member 40. After the resilient compliant member 45 has been press fitted into plunger member 40, member 51 is secured to the left-hand end of rod 39 by a riveting operation causing the resilient compliant member 45 and plunger member 40 to be tightly sandwiched between member 51 and flange 39*c*, thereby securing in place the elements 39, 40, 45 and 51.

Annular groove 40 receives a resilient compliant O-ring 53 whose cross-sectional diameter is substantially less than the width of groove 40*b*.

The operation of the damper assembly 30 is as follows:

Let it be assumed that the print head is now in the process of printing a line of characters. O-ring 53 occupies the position shown in FIG. 3*a* at this time so as to unseal the openings of breather holes 41 and 42 which communicate with groove 40*b*.

Upon completion of either a full or partial line of print, clutch 15 is deenergized, placing carriage 22 and hence print head 23 under the influence of stretched spring 25. It should be understood that pulleys 18 and 20 are preferably free-wheelingly mounted about their shafts 17 and 21 respectively, so as to enable carriage 22 to move rapidly toward the lefthand margin of paper document 12.

At this time, O-ring 53 occupies the position shown in FIG. 3*a* so that the ends of breather hole openings 41 and 42 entering into groove 40*b* are unsealed. As the carriage 22 nears machine frame support $F_1$, plunger assembly 32 begins to enter into the opening 35*a* in cylinder 35. The frictional fit between O-ring 53 and interior wall of cylinder 35 pushes or slides O-ring 53 from the position shown in FIG. 3*a* to the position shown in FIG. 3*b*, whereupon the O-ring acts to seal the ends of breather holes 41 and 42 which terminate in groove 40*b*.

When the O-ring 53 is moved to the position shown in FIG. 3*b*, the right-hand wall of groove 40*b* prevents any further movement of the O-ring which, together with the plunger member 40, serves to substantially completely air-tightly seal the open end of cylinder 35 so that air is permitted to exit only from the cylinder through the cylinder breather hole in a controlled manner. The only egress for air is thus the cylinder breather hole 35*c* which is preferably adjusted by set screw 37 to release air slowly so as to rapidly attenuate and dampen the movement of plunger assembly 32 and hence carriage 22 and print head 23. In the case where the plunger has not yet been completely brought to a stop, resilient compliant member 45 serves as a final buffer means which is arranged to impact the base of the opening in cylinder 35 to prevent any jarring of the components by undergoing compression sufficient to absorb and cushion any final impact.

As soon as the printing of the next line is to begin, clutch 15 is energized to drive the carriage 22 and print head 23 in the print direction shown by arrow 24. As soon as the carriage begins to move to the right, plunger assembly 32 is carried therewith. The frictional engagement between O-ring 53 and the interior wall of cylinder 35 causes O-ring 53 to move from the position shown in FIG. 3*b* to the position shown in FIG. 3*a* whereupon the breather hole openings extending into groove 40*b* are unsealed, thereby allowing air to pass between the outer surface 47*a* of member 40 and the inner surface of opening 35*a* so as to enter into breather openings 41 and 42 and co-axially aligned openings 48 and 49 in resilient compliant member 45, serving to permit air to enter at a rate sufficient to compensate for the continually increasing internal volume defined by the exiting plunger and the interior of cylinder 35. This arrangement thereby permits the carriage assembly to be rapidly accelerated to the desired print velocity so as to be enabled to begin printing the very first character of the next line of print "on the fly."

This operation is repeated during each subsequent printing and carriage return operation.

Whereas the present invention shows the cylinder mounted in a stationary fashion and the plunger mounted to the carriage, obviously the reverse arrangement may be employed if desired.

It can be seen from the foregoing description that the present invention provides a novel damper assembly of greatly simplified design and which has a unique one-way action through the advent of a rolling or sliding O-ring to permit dampening of carriage movement in only the carriage return direction while enabling the carriage to be rapidly accelerated and begin printing when moved in the "print" direction.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Means for providing one-way dampening action for a member reciprocating between two end positions, comprising:

a plunger assembly;

a cylinder assembly;

one of said assemblies being mounted adjacent one end position and the other assembly being secured to said reciprocating member;

said cylinder assembly having a cylinder opening co-axially aligned with said plunger assembly;

said plunger assembly having a cylindrical shaped end portion provided with a continuous annular groove about its periphery and having a face;

a resilient compliant O-ring being positioned within said groove, the diameter of the O-ring cross-section being less than the width of said groove to permit said O-ring to move along said groove;

the outer periphery of said O-ring being adapted to engage said cylinder opening;

said plunger assembly being completely removed from said cylinder opening when said reciprocating member is at a remaining end position;

said cylinder end portion and O-ring being adapted to enter into the open end of said cylinder as said reciprocating member approaches said one end position;

said cylindrical end portion having at least one opening in the face thereof confronting said cylinder, said opening entering into a passageway which communicates with an exit opening in said groove adjacent a wall of said groove furthest from said face of said cylindrical end portion;

said O-ring engaging the interior wall of said cylinder opening and being adapted to be moved over the opening in said groove to seal said opening as said plunger enters into said cylinder opening to prevent the egress of air therethrough;

said O-ring being adapted to slide away from the opening in said groove as said plunger moves out of said cylinder opening to permit air to enter into the hollow interior region of said cylinder defined by the cylinder interior and said cylindrical end portion and O-ring to equalize the pressure on the opposite sides of said cylinder, thereby providing a dampening action for said reciprocating meamber as said plunger enters into said cylinder opening and further facilitating rapid removal of said plunger and rapid acceleration of said reciprocating member as said plunger moves out of said cylinder.

2. The apparatus of claim 1 wherein said cylinder assembly is provided with a breather hole in the closed end thereof for permitting the ingress and egress of air therethrough.

3. The apparatus of claim 2 further comprising a tapped opening arranged to intersect with said breather hole;

a set screw threadedly engaging said tapped opening and adapted to enter into said breather hole opening to control the rate of flow of air through said breather hole passageway.

4. The apparatus of claim 1 further comprising a substantially cylindrical shaped resilient compliant member secured to the face of said cylindrical end portion and having an opening coaxially aligned with the opening in the engaging face of said cylindrical end portion to permit the passage of air through said coaxially aligned openings when said plunger is being removed from said cylinder.

5. The apparatus of claim 1 wherein said cylindrical end portion is provided with a plurality of said openings at spaced intervals about said cylindrical end portion and extending from the face confronting said cylinder opening and into said groove adjacent the wall of said groove furthest from said confronting face for being selectively sealed by said O-ring as said plunger assembly enters into said cylinder opening and being unsealed by said O-ring as said plunger assembly is removed from said cylinder opening.

6. Means providing one-way dampening action for a member reciprocating between two end positions, comprising:

a plunger assembly;

a cylinder assembly;

said cylinder assembly being mounted adjacent one end position and having a cylinder opening co-axially aligned with said plunger assembly;

said plunger assembly having a cylindrical shaped end portion having a central opening therethrough and provided with a continuous annular groove about its periphery;

said plunger assembly including an elongated rod having a threaded first end for securement to a tapped aperture in said reciprocating member, said elongated rod having a cylindrical shaped flange spaced inward from its opposite end, said opposite end extending through said central opening of said cylindrical end portion;

a resilient compliant O-ring being positioned within said annular groove, the diameter of the O-ring cross-section being less than the width of said groove to permit said O-ring to move along said groove;

the outer periphery of said O-ring being adapted to engage said cylinder opening;

said cylindrical end portion and said O-ring being adapted to enter into the open end of said cylinder as said reciprocating member approaches said one end position; said cylindrical end portion having at least one further opening in the face thereof confronting said cylinder, said opening entering into a passageway which communicates with an exit opening in said groove adjacent a wall of said groove farthest from said face from said cylindrical end portion;

a substantially cylindrical shaped resilient compliant member secured to the face of said cylindrical end portion and having an opening co-axially aligned with said further opening in the engaging face of said cylindrical end portion to permit the passage of air through said co-axially aligned openings when said plunger assembly is being removed from said cylinder, said resilient compliant member having a central opening co-axially aligned with said central opening of said cylindrical end portion;

a fastening member mounted upon said opposite end of said rod and extending through said co-axially aligned central openings and having a head portion for securing said resilient compliant member to said rigid cylindrical end portion;

said O-ring engaging the interior wall of said cylinder opening and being adapted to be moved over the opening in said groove to seal said opening as said plunger enters into said cylinder opening to prevent the egress of air therethrough;

said O-ring being adapted to slide away from the opening in said groove as said plunger moves out of said cylinder opening to permit air to enter into the hollow interior region of said cylinder defined by the cylinder interior and said cylindrical end portion and O-ring to equalize the pressure on the opposite sides of said cylinder, thereby providing a dampening action for said reciprocating member as said plunger enters into said cylinder opening and further facilitating rapid removal of said plunger and rapid acceleration of said reciprocating member as said plunger moves out of said cylinder.

* * * * *